United States Patent [19]

Ono et al.

[11] Patent Number: 4,706,095
[45] Date of Patent: Nov. 10, 1987

[54] PORTABLE THERMAL LABEL PRINTER

[75] Inventors: Tsutomu Ono, Iwateken; Tadao Kashiwaba, Iwate, both of Japan

[73] Assignee: Kabushiki Kaisha Sato, Japan

[21] Appl. No.: 875,277

[22] Filed: Jun. 17, 1986

[30] Foreign Application Priority Data

Jun. 26, 1985 [JP] Japan .................. 60-137858

[51] Int. Cl.⁴ .............. G01D 15/10; B65C 9/18; B41J 3/20; G06K 19/00
[52] U.S. Cl. .................. 346/76 PH; 101/66; 101/93.04; 101/288; 156/384; 156/577; 156/DIG. 47; 156/DIG. 49; 156/DIG. 51; 235/385; 235/432; 235/487; 235/488; 400/120; 400/73; 400/103; 346/136
[58] Field of Search ............. 346/76 PH, 136; 101/93.04, 93.05, 288, 291, 292, 66; 156/384, 570, 577, 579, 584, DIG. 51, DIG. 47, DIG. 48, DIG. 49; 235/378, 383, 385, 432, 472, 487, 488, 494; 400/120, 73, 103

[56] References Cited

U.S. PATENT DOCUMENTS

| | | | |
|---|---|---|---|
| 4,268,179 | 5/1981 | Long et al. | 400/120 |
| 4,516,016 | 5/1985 | Kodron | 235/472 |
| 4,544,287 | 10/1985 | Teraoka | 400/120 |
| 4,569,421 | 2/1986 | Sandstedt | 186/39 X |
| 4,578,140 | 3/1986 | Nakajima | 156/384 |

*Primary Examiner*—E. A. Goldberg
*Assistant Examiner*—Gerald E. Preston
*Attorney, Agent, or Firm*—Ostrolenk, Faber, Gerb & Soffen

[57] ABSTRACT

A portable thermal label printer employing an optical reader such as a pen or touch scanner for data input is disclosed. The operator needs only to hold the scanner, while the remaining components are held around the operator's waist or the like. The operator can therefore use both hands to handle articles of freight, and enables freight to be handled and labels to be printed easily and efficiently. Further, the arrangement of the thermal label roll with respect to the thermal print head enables the overall unit to be made light and compact.

6 Claims, 5 Drawing Figures

PORTABLE THERMAL LABEL PRINTER

BACKGROUND OF THE INVENTION

This invention relates to a portable thermal label printer employing an optical reader and more particularly to a portable thermal label printer which has improved portability and operability while various articles of freight are being handled.

With conventional portable thermal label printers in use at supermarkets and other such retail outlets, the whole printer is held in the hand and is used like a hammer in order to have the printed labels peeled off and applied to the merchandise.

At retail outlets, individual items of merchandise are not large. Therefore, such printers can be used while manipulating the merchandise, even if the printer is somewhat heavy. However, in the freight business where various articles of freight and boxes have to be handled, there has been a need for a thermal label printer which is light and easy to use. It is of course also desireable that thermal label printers in use at retailers have better portability and operability.

Because of the weight of the batteries used for driving its many parts and components, it has heretofore been hard to create a portable thermal label printer which could be used while being hand-held, yet which is light and has good operability.

Further, label printer/applicators commonly referred to as hand labelers are designed with the thermal label roll to be positioned at the top of the labeler. This however, led to problems as illustrated in the prior art shown in FIGS. 4 and 5. The thermal label strip T which is paid out from thermal label roll R is printed between a thermal print head 20 and a platen 21. At bending pin 16, the backing sheet S is redirected so that label L is discharged from the printer unit. The backing sheet S is moved by engagement with the conveyor roller 19 and is discharged from the rear of the unit. The thermal print head 20 is driven and controlled by a control circuit 26 which is connected to a battery 27. The thermal label strip T must cross a flat cable C, which when used to connect the control circuit 26 with the thermal print head 20, forms an intersection K. One solution is to divide the flat cable C so that it goes to the left and right of the thermal label strip T. Such a structure has required that the printer be designed so that the thermal label printer becomes larger or heavier.

SUMMARY OF THE INVENTION

An object of the present invention is to provide a portable thermal label printer which can be easily used to print labels even while relatively large articles of freight are being handled.

The present invention attains this object by providing a portable thermal label printer wherein the only portion that is held in the hand is the optical scanner, such as a pen scanner or touch scanner. Since the optical scanner is light and easy to operate, the printing and other mechanisms can be arranged about the person. Therefore, the operator's hands are freed, which improves work efficiency. By eliminating the intersection between the thermal print head flat cable and the thermal label strip, the printer may be made even smaller.

It is still a further object of the present invention to provide a portable thermal label printer for use by an operator comprising a label printer unit, a thermal label strip and a thermal label printer disposed in the label printer unit. The thermal label printer has a thermal print head having a heating surface on one side thereof for printing on the thermal label strip. The thermal label strip is disposed in the label printer unit so as to be adjacent to and completely on the same side of the heating surface. Further, a carrying device is used for carrying the label printer unit about the body of an operator.

DESCRIPTION OF THE PREFERRED EMBODIMENT

Figure 1:
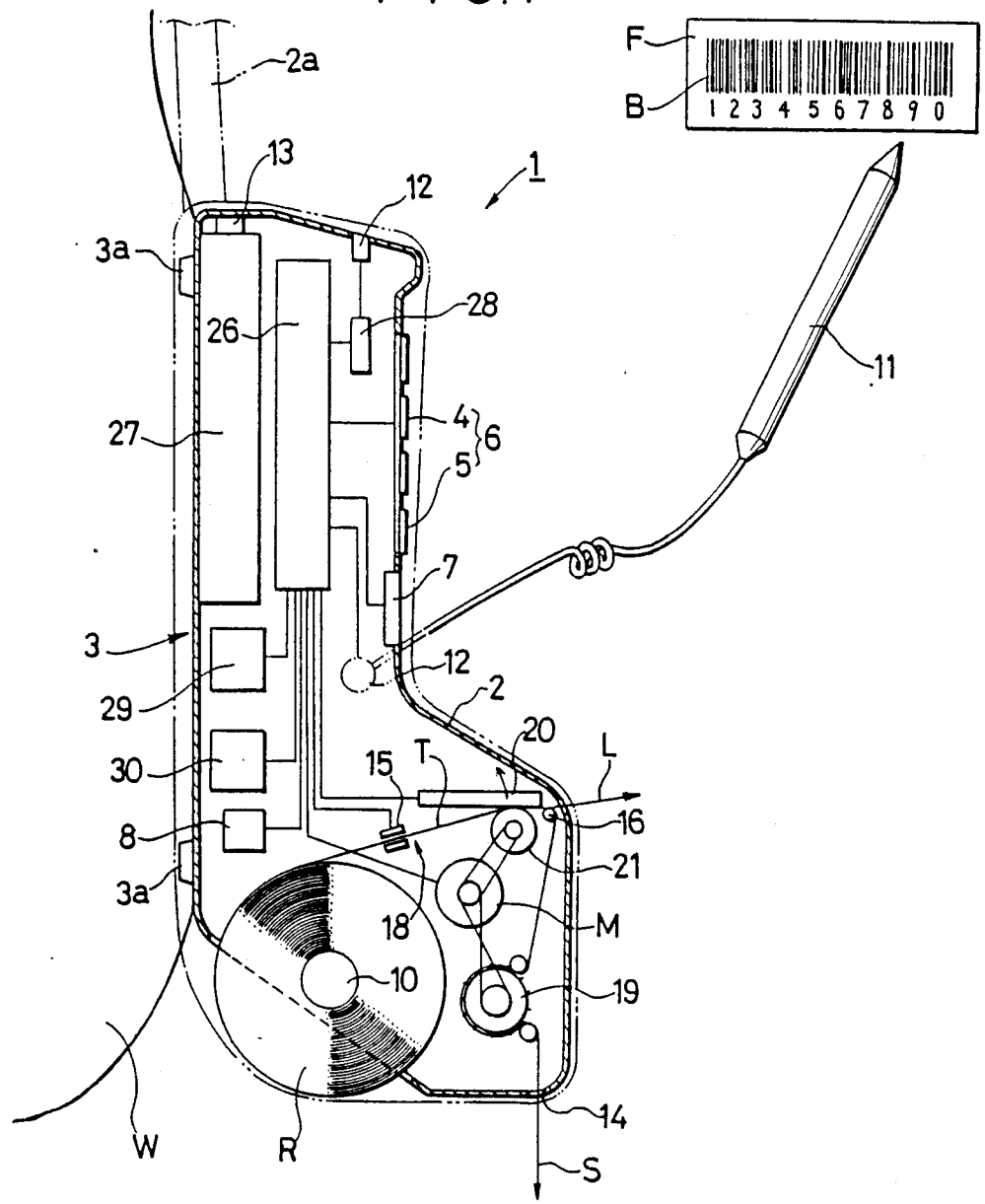
FIG. 1 is a sectional side view of a portable thermal label printer of the present invention.

With reference to FIG. 1, the thermal label printer 1 includes a portable main unit 2 which has a side surface 3 for contacting a selected part of a person's body, such as for example the waist W of an operator. The side surface 3 is provided with feet 3a formed of rubber, or the like. This enables the printer to be set on any surface for use as a desk-top type printing unit. The main unit 2 is provided with a shoulder carrying strap 2a which enables the main unit 2 to be carried from the shoulder as well as about the waist. A belt or the like (not shown) may also be used to place the main unit 2 about the waist W.

The main unit 2 is provided on its top surface with data and command entry consisting of a keyboard 6, comprising a numeric pad 4 and various function keys 5. Positioned above the keyboard is a display 7, for example, a liquid crystal display. The main unit 2 is also provided with a power switch 8 on one side. Main unit 2 is further provided, at a lower portion, with a support member 10 for holding a thermal label roll R. The thermal label roll R consists of a thermal label strip T wound into a roll. After labels L are printed and detached, the labels L are discharged from slightly below the upper surface portion of the main unit 2.

At the rear end of the main unit 2 there is a socket 12a for connecting a pen scanner 11. A socket 13 is used for connecting a battery 27 to a battery charger. The backing sheet S exits the main unit 2 at discharge outlet 14. The pen scanner 11 can be used to read a slip number bar code B on a label F which was previously affixed to a box or other article of freight (not shown) for inputting such code into the printer 1.

The thermal label strip T passes from thermal label roll R on support member 10, into label strip passage 18 via position sensor 15.

Figure 2:
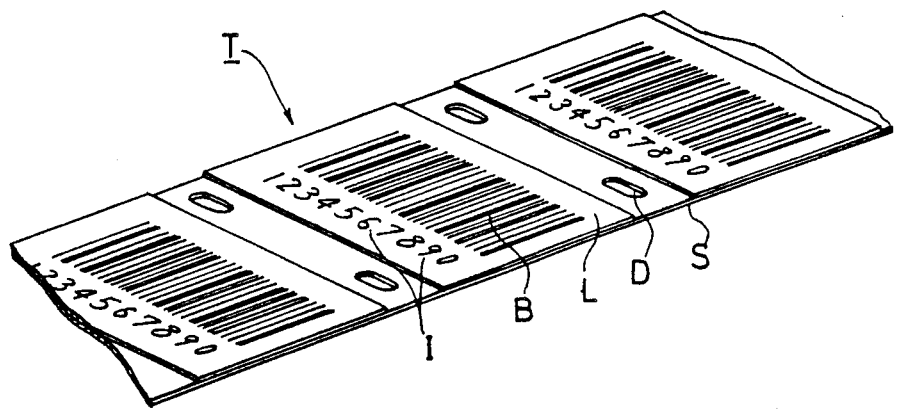
FIG. 2 is a perspective view of a segment of a label strip.

As shown in FIG. 2, the label strip T consists of a backing sheet S which is coated with a separating agent. The label strip T carries a plurality of labels L, each of which is coated with an adhesive and is thereby detachably adhered continuously along the strip T length. On the labels L of the thermal label strip T there is printed a slip code I which corresponds to bar code B and to other information I on tag F. The backing sheet S is provided with holes D which are for detection of the position of the strip T. The holes D may also be utilized for sheet conveyance purposes by engagement with conveyor roller 19 (FIG. 1).

As shown in FIG. 1, the thermal label strip T passes via conveyor roller 19 to thermal print head 20 and platen 21. The thermal label strip T is redirected at the platen 21 portion where labels L are peeled off backing sheets. Therefore, just the backing sheet S is directed back for engagement with the conveyor roller 19. The backing sheet S feeds out from the main unit 2 via discharge outlet 14. The conveyor roller 19 is driven by the stepped rotation action of stepping motor M and moves the thermal label strip T in the required direction for printing and conveyance.

Although label L is shown as being peeled off, the thermal label strip T may also be fed out of the main unit 2 without being peeled off, after having passed between thermal print head 20 and platen 21. Further, during insertion of the label strip T, the thermal print head 20 may be separated from the platen 21, as indicated by the arrow.

The main unit 2 houses a control circuit 26 which is connected to battery 27, interface 28, ROM program memory 29, RAM data memory 30, and keyboard 6. The interface 28 is used for data input to and from external devices while ROM 29 is used for communication and control programs. The display 7, sensor 15, thermal print head 20 and stepping motor M are also connected to and controlled by control circuit 26. The battery 27 is preferably a rechargeable type and can be connected via socket 13 to an external battery charger (not shown).

Figure 4:
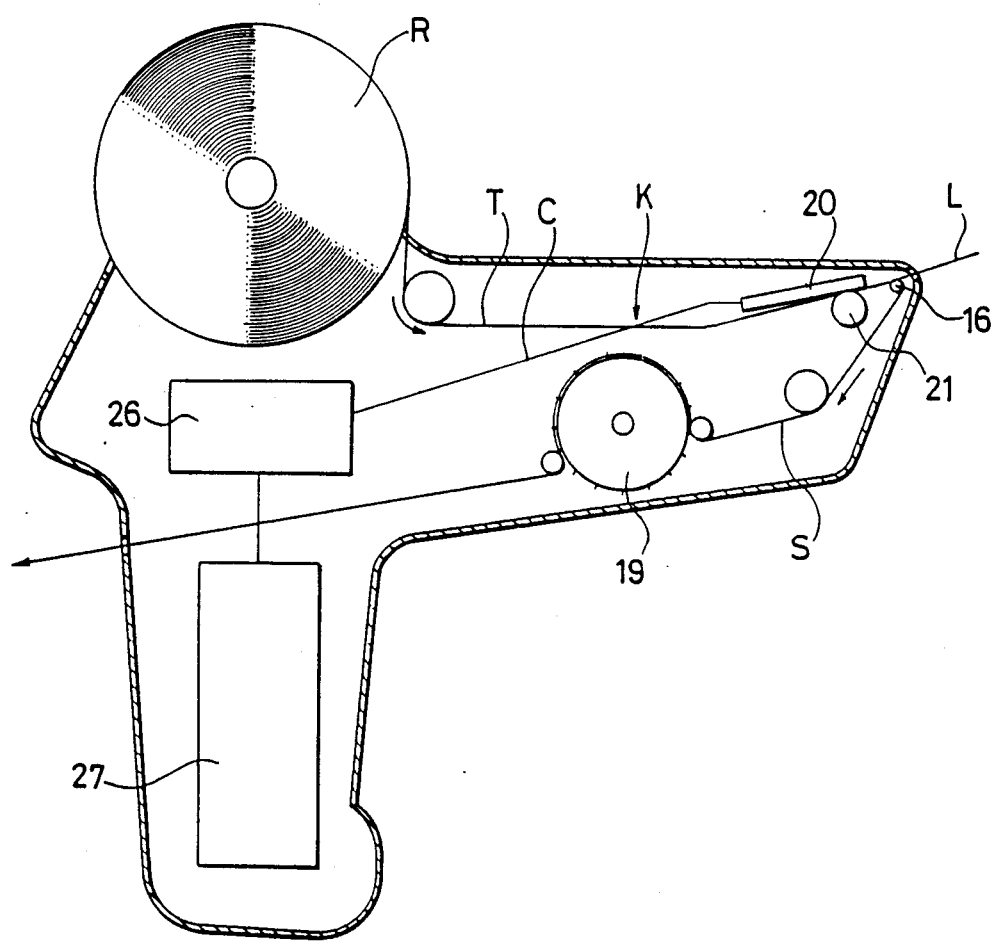
FIG. 4 is an outline view of a conventional portable thermal label printer.
Figure 5:
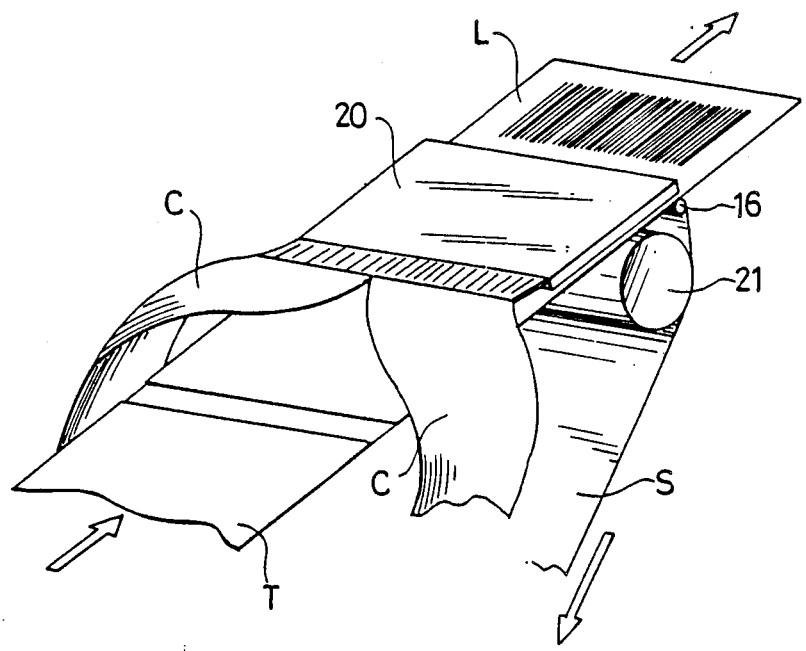
FIG. 5 is a view of the principal portions of a prior art printer in the vicinity of the thermal print head.

The support member 10 of the thermal label roll R is placed on the heating-surface side of the thermal print head 20. Therefore, there is no intersection of flat cable C that extends between circuit 26 and thermal head T (see FIG. 4) and the thermal label strip T. This enables the overall design to be made more compact, which is also desirable in that it provides portability.

Figure 3:
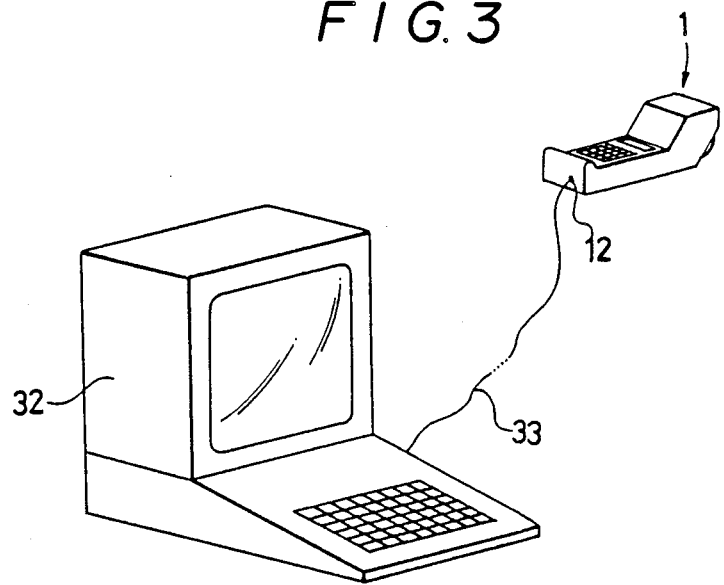
FIG. 3 is a view illustrating the printer of the present invention connected to a microcomputer.

FIG. 3 shows thermal printer 1 connected to microcomputer 32 so as to allow data I/O operations therebetween. Data can be transferred to the microcomputer 32 via interface 28, through socket 12 and cable 33. Alternately, an acoustic coupler may also be used to link the printer 1 to a host computer via a wired or wireless link (not shown).

The operation of the present invention will now be explained with reference to an exemplary application of labels during the handling of articles of freight in the freight business.

The operator carries the printer at his waist or hung from the shoulder by means of a belt or shoulder carrying strap, or the like, 2a. This leaves the operator's hands free of printer 1. Therefore, only a very lightweight pen scanner 11 is needed to be held in one hand to operate the unit. Therefore, if the operator usually leaves the pen scanner 11 in a breast pocket or the like, he can have both hands free to deal with articles of freight. Thus, freight items can be dealt with and labels printed out with none of the operational inconvenience of conventional label printers.

The operator uses the pen scanner 11 to read bar code B of tags F which have previously been attached to the articles of freight (usually in cardboard boxes). The read data is stored in data memory 30. Upon a print command signal being issued by control circuit 26, information having the same kind of content as that of the tags F is printed on the labels L in accordance therewith. Specifically, one of the function keys 5 is a print button (not shown). When the print button is pressed, the conveyor roller 19 rotates thereby moving the thermal label strip T. The thermal print head 20 will then print the required bar code B on the label L in accordance with a predetermined print pattern. As the backing sheet S alone is redirected at the platen 21, the labels L are peeled from the backing sheet S and discharged from the main unit 2. However, instead of using the print button, control may be effected whereby the printing is carried out immediately following completion of the reading operation by pen scanner 11.

When many articles of freight have to be processed for dispatch, labels L this printed and peeled, may be taken and stuck on the feight by hand. Alternately, keyboard 6 can be employed for data input rather than pen scanner 11. Also, inputted data may be shown on the display 7 for confirmation purposes.

When data, which has been inputted by pen scanner 11 or keyboard 6, has been temporarily stored in data memory 30, it may if required, be uploaded for processing to microcomputer 32 or a host computer, as shown in FIG. 3. This is done as mentioned by interface 28 and socket 12. The socket 12 can also be used for inputting data into the printer from other external devices.

Thus, the printer according to this invention is widely applicable when labels have to be printed in accordance with various types of data transactions. These applications could not previously be handled by conventional printers.

Some potential applications for the present thermal printer include inventory control of retail outlets, management of business data files, printing of blood data cards and sample tube labels at blood banks, printing of bar code labels for patient charts and medical certificates at hospitals and clinics, process, parts and inventory control in factories, and the management of customer data, as well as data and printing of labels relating to outside suppliers at department stores and supermarkets.

Thus, with the portable thermal label printer according to this invention the operator only has to hold the pen scanner or whatever optical scanning means is used, and therefore is free to use both hands to handle articles of freight. Therefore, it enables freight to be handled and labels printed efficiently. In addition, the arrangement of the thermal label roll and thermal printing means is such that the overall unit can be easily made more compact, enabling a printer to be provided that is light and has good operability.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A portable thermal label printer, comprising:
   a label printer unit having data memory means for storing data therein, a program memory means for storing a sequence of instructions therein, an input/output means for providing data communication with other device external to said label printer unit, and control means connected to said data memory means, said program memory means and said input/output means for controlling the above mentioned means of said label printer unit;

a label strip transport for transporting a strip of labels and a support member for supporting a roll of the strip of labels in said label printer unit;

a thermal label printer disposed in said label printer unit for printing information on the strip of labels, said thermal label printer having a thermal print head and wire means for connecting said thermal print head to said control means and further having a heating surface on one side thereof, said label strip transport being effective to transport the strip of labels in a non-intersecting relationship with said wire means, said support for the roll of the strip of labels being positioned such that when the roll is inserted into the label printer unit the entire roll is disposed to the side of said thermal print head which contains said heating surface; and means for carrying said label printer unit about the body of an operator in a manner that the label printer unit moves with the operator and is operable without being supported by any hand of the operator.

2. A portable thermal label printer for use by an operator according to claim 1, further comprising an optical scanner input device connected to and controlled by said control circuit, for scanning predetermined printed information or the like.

3. A portable thermal label printer according to claim 1, wherein the label printer unit includes a first surface, which is suitable for contacting a selected part of an operator's body and strap means for enabling wearing of the label printer unit by the operator such that the first surface is held to the operator's body.

4. A portable thermal label printer according to claim 3, further comprising a second surface which is not in contact with the operator's body and a keyboard which is disposed on the second surface of the label printer unit.

5. A portable thermal label printer according to claim 4, wherein said control circuit and wire means are disposed in said label printer unit such that they are located on a side of said print head which is located oppositely to the side containing said heating surface.

6. A portable thermal label printer according to claim 3, further comprising means for peeling labels from the label strip, a second surface which is not in contact with the operator's body and a center region at said second surface, said transporting means and label peeling means being effective to guide printed and separated labels through said center region out of said label printer unit.

* * * * *